United States Patent
Etzel

[11] Patent Number: 6,031,924
[45] Date of Patent: Feb. 29, 2000

[54] FIXED MOUNTING LOUDSPEAKER WITH REMOVABLE CHASSIS

[75] Inventor: Hubert Etzel, Landau, Germany

[73] Assignee: Harman Audio Electronic Systems GmbH, Straubing, Germany

[21] Appl. No.: 08/826,195

[22] Filed: Mar. 27, 1997

[30] Foreign Application Priority Data

Mar. 27, 1996 [DE] Germany ............ 196 12 080

[51] Int. Cl.⁷ ................................. H04R 1/02
[52] U.S. Cl. .................. 381/389; 381/386; 381/87
[58] Field of Search ................. 381/332, 152, 381/374, 386, 389, 87; 379/426, 428, 433, 440; 455/90; 181/179, 171

[56] References Cited

U.S. PATENT DOCUMENTS

| | | | |
|---|---|---|---|
| 4,546,850 | 10/1985 | Litner | 381/389 |
| 4,630,303 | 12/1986 | Tanno | 381/87 |
| 4,733,748 | 3/1988 | Ponticelli, Jr. | 381/386 |
| 4,847,907 | 7/1989 | Ando | 381/86 |
| 4,852,178 | 7/1989 | Inkman et al. | 381/386 |
| 4,919,369 | 4/1990 | Stehn . | |
| 4,997,059 | 3/1991 | See | 381/386 |
| 5,048,089 | 9/1991 | Moore | 381/87 |
| 5,094,316 | 3/1992 | Rosen | 381/87 |
| 5,168,527 | 12/1992 | Loya | 381/87 |
| 5,287,412 | 2/1994 | Etzel et al. | 381/86 |
| 5,416,283 | 5/1995 | Dault et al. . | |
| 5,588,066 | 12/1996 | Yang et al. | 381/87 |
| 5,627,904 | 5/1997 | Yang et al. | 381/87 |
| 5,640,461 | 6/1997 | Ebert et al. | 381/87 |
| 5,859,917 | 1/1999 | Silber et al. | 381/386 |

FOREIGN PATENT DOCUMENTS

| | | |
|---|---|---|
| 0523410 | 6/1992 | European Pat. Off. . |
| 0523410 | 1/1993 | European Pat. Off. . |
| 0577221 | 1/1994 | European Pat. Off. . |
| 2834238 | 2/1980 | Germany . |
| 3534521 | 4/1987 | Germany . |
| 3634269 | 4/1988 | Germany . |
| 3706918 | 9/1988 | Germany . |
| 3820747 | 12/1989 | Germany . |
| 4121408 | 1/1993 | Germany . |
| 4137304 | 5/1993 | Germany . |
| 9101544 | 2/1991 | WIPO . |

*Primary Examiner*—Paul Loomis
*Assistant Examiner*—Rexford N Barnie
*Attorney, Agent, or Firm*—Ware, Fressola, Van Der Sluys & Adolphson LLP

[57] ABSTRACT

A loudspeaker (1) is connected to a chassis (13) and is capable of being inserted into a housing (28) by means of a releasable engagement of the loudspeaker (10) in the housing in an arrangement which makes better use of the available space in the vehicle, by allowing placement of the loudspeaker (10) at locations which are intended by the car manufacturer to be used for other accessories, although only temporarily. It is therefore possible to place the loudspeaker (10) of the invention in a push-through tunnel (29) adapted to allow items to be pushed through the rear seat back (36) of the automobile.

11 Claims, 5 Drawing Sheets

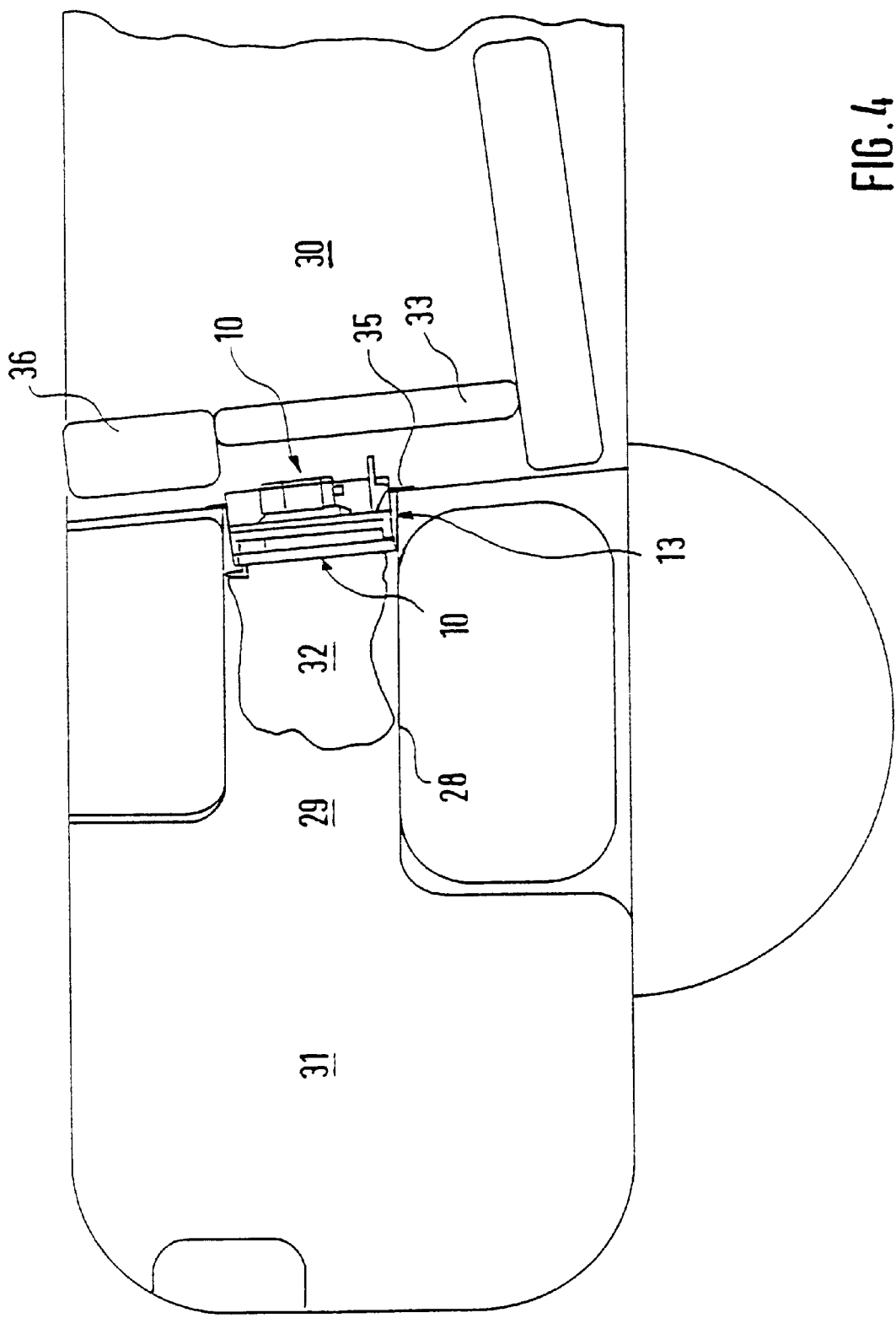

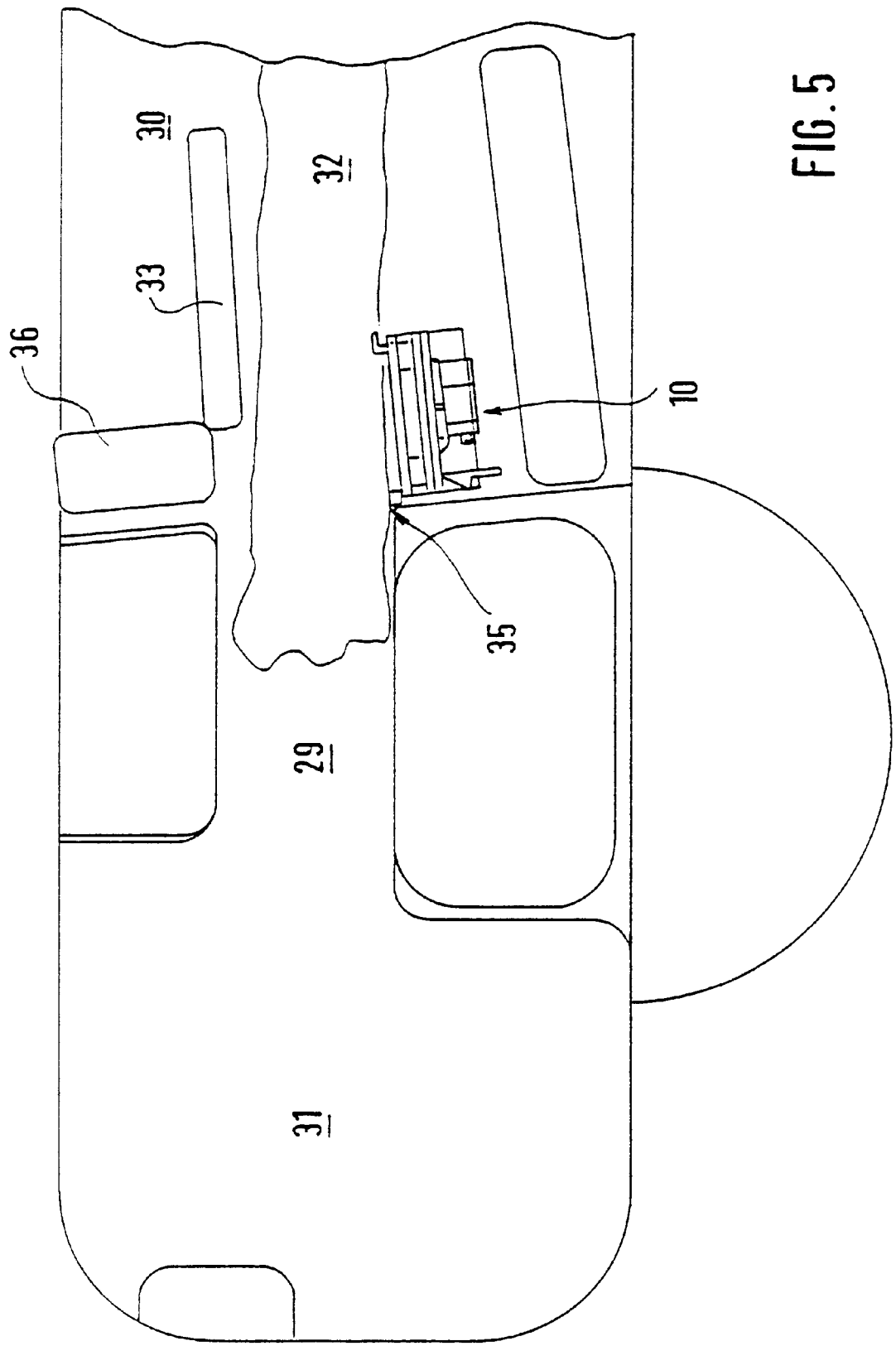

FIXED MOUNTING LOUDSPEAKER WITH REMOVABLE CHASSIS

BACKGROUND OF THE INVENTION

1. Field of the Invention

The invention relates to the placement of loudspeaker in automobiles.

2. Description of Related Art

It is known to mount loudspeakers in housings in order to prevent acoustic short circuits between the sound waves emitted from the front and rear side of the loudspeaker membrane by having the housing act as a sound barrier. This is usually implemented by placing the chassis of a loudspeaker which may comprise, depending on the design, either the loudspeaker frame itself or the loudspeaker frame and a mounting frame connected therewith, in a mounting opening of the housing and securing the chassis in its final position to the housing with fasteners. Since loudspeakers often have a significant weight and since the loudspeaker, when installed in a housing, should be capable of providing an airtight seal with the mounting opening preferably during its entire life, in high-end arrangements the chassis are not glued to the housing, but secured to the housing with screws or snap connections. It is easily recognized, though, that loudspeakers of this type can be released from the housing only with the help of appropriate tools.

The integration of loudspeakers in automobiles continues to pose additional problems. This problem which is encountered in particular with woofers and bass box concepts, respectively, stems from the fact that configurations for an acceptable bass reproduction require a large interior volume in the vehicle and that such volumes are not provided by the car manufacturer. The problem, however, is somewhat alleviated in that sound waves, when restricted to signals of low frequency, cannot be pinpointed by the human ear. Consequently, woofers do not necessarily have to be directed towards a listener. This phenomenon can be advantageously employed by placing the loudspeakers or loudspeaker assemblies emitting low frequencies, for example, underneath the front seats (as described in WO 91/01544) or in the rear center arm rest (as described in EP 0523410) of the vehicle.

SUMMARY OF THE INVENTION

Since, however, the space underneath the seats or in the rear center arm rest is frequently not available, is it the object of the invention to facilitate the use of large-size loudspeakers for the bass reproduction in automobiles without the space or volume confines imposed for such applications by the car manufacturer.

According to the present invention, a loudspeaker includes a chassis and a housing, wherein the chassis is inserted into the housing and a final position of the chassis in the housing resulting from said insertion is fixed by way of at least one fastening means formed from two mutually complementary parts comprising a first part and a second part, wherein at least a certain number of said at least one fastening means includes one or more movably operable handles having said first part thereon for fixing said chassis in said final position, and wherein the chassis fixed in the housing is movable from the final position by operating said one or more handles.

It is a major feature of the invention to connect a certain number of all existing fastening means via at least one handle, so that the chassis can be disengaged from its final position in the housing by using said handle(s).

In further accord with the present invention, fastening means without a handle is formed by said first part comprising a latch for engagement in an opening comprising said second part for locking the chassis in said final position in the housing.

In still further accord with the present invention, at least one fastening means further comprises a hinge assembly, whereby for further releasing the chassis from the final position the chassis is rotatably secured in the housing for rotation about the hinge assembly.

Further in accordance with the present invention, there is provided on the chassis first electrical contact means and on the housing there is provided second electrical contact means complementary to the first contact means, wherein at least one conductive link is established between said first contact means and said second contact means in said final position of said chassis in the housing. Additionally, at least one fastening means can be formed by the first electrical contact means and the second electrical contact means forming or at least forming in part each of the two mutually complementary parts. A sensor can be provided as well for connection to an interrupt circuit for interrupting said conductive link when the chassis is disengaged from the final position in the housing.

In accordance still further with the present invention, the housing is formed by a "push-through" tunnel connecting a trunk of an automobile with an interior space thereof. The push-through tunnel can be an opening for a ski bag, for example.

According still further to the present invention, the chassis may be provided with a gasket for preventing penetration of gas between walls of the housing and the chassis when the chassis is in said final position in the housing.

Through these measures, it is possible to better utilize the existing space in an automobile, since as a result of the removability of the loudspeaker, an already available space in the automobile, which, according to the designation by the car manufacturer, is intended for accessories usable by the vehicle owner only on a limited number of days during the year, can now be advantageously utilized therefor. An accessory of this type is, for example, the opening for a ski bag, which is considered a significant option by the car manufacturer, but used only infrequently by the owner. If this push-through tunnel in the automobile adapted for holding the ski bag is used for the installation of an additional loudspeaker, then this loudspeaker will help improve the sound reproduction during most of the time the automobile is in use. The push-through tunnel in the rear seat back is here of particular importance for mounting the removable loudspeaker, since by placing the loudspeaker inside the tunnel and thereby connecting the car interior with the trunk which is also not in use during most trips, the trunk space can be utilized for sound reproduction, in particular bass reproduction. This, however, does not mean that the loudspeaker, when placed in a push-through tunnel of this type, can only be used when the trunk is empty. The loss in quality resulting from a full trunk is insignificant and the bass reproduction is much improved over an arrangement where no loudspeaker is placed in the push-through tunnel.

If the loudspeaker is hingedly supported in the housing, then storage-related problems are obviated should the location where the loudspeaker is placed, be used for the function originally designated by the car manufacturer.

It is particularly advantageous if mutually complementary contact means are provided on the chassis and on the housing adapted to mesh when the chassis assumes its final position in the housing, thereby eliminating separate measures for contacting the loudspeaker.

The handling and fabrication of the aforedescribed loudspeakers is particularly simple if at least one fastening means consisting of two parts forms at the same time the first and second contact means, since in this way current is supplied from a current source to the loudspeaker at the same time the loudspeaker assumes its final position.

A sensor may be provided for currentless switching the second contact means disposed on the housing, thereby preventing short circuits which may otherwise occur if the respective installation location is used for the original use designated by the car manufacturer. The latter feature is especially significant if the loudspeaker is operated as a so-called active loudspeaker, since in this case the loudspeaker is not only provided with acoustic signals, but must also be provided with an independent power supply for operating the amplifier. These and other objects, features and advantages of the present invention will become more apparent in light of the detailed description of a best mode embodiment thereof, as illustrated in the accompanying drawing.

BRIEF DESCRIPTION OF THE DRAWING

FIG. 4 is another view according to FIG. 3; and

FIG. 5 is another view according to FIG. 4.

DESCRIPTION OF THE PREFERRED EMBODIMENTS

Figure 1:
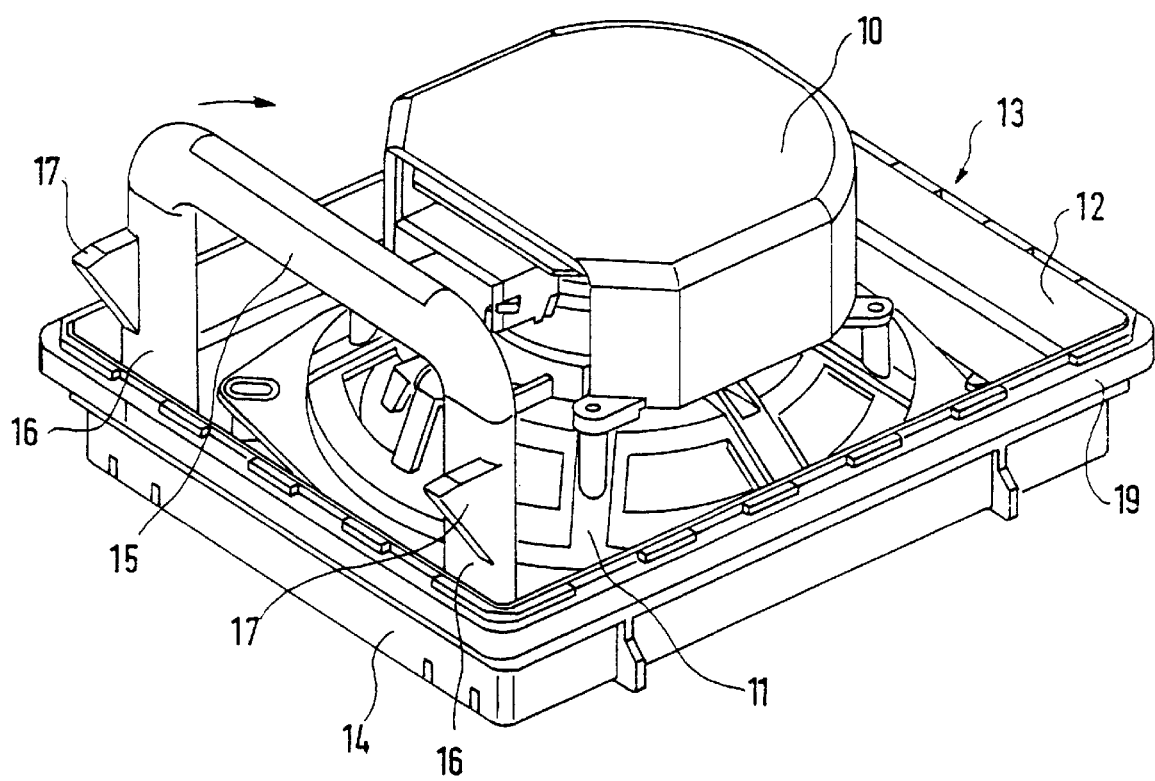
FIG. 1 is a perspective view of a (built-in) loudspeaker.

FIG. 1 shows a bass loudspeaker (woofer) (10). The woofer (10) is connected via the loudspeaker frame (11) with the mounting frame (12). Within the context of the present application, the combination of loudspeaker frame (11) and mounting frame (12) will be called chassis (13).

Figure 2:
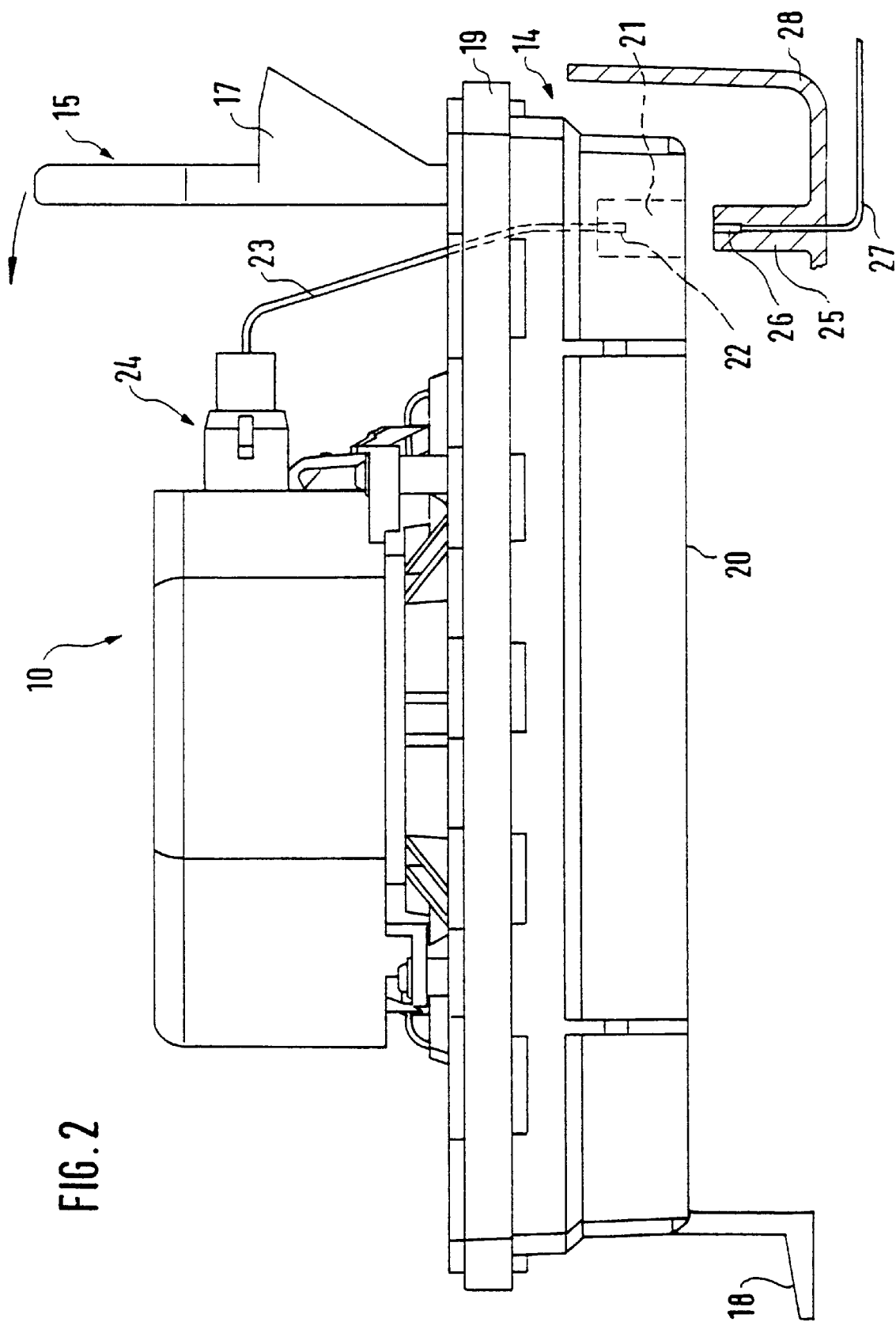
FIG. 2 is a side view of a loudspeaker according to FIG. 1.
Figure 3:
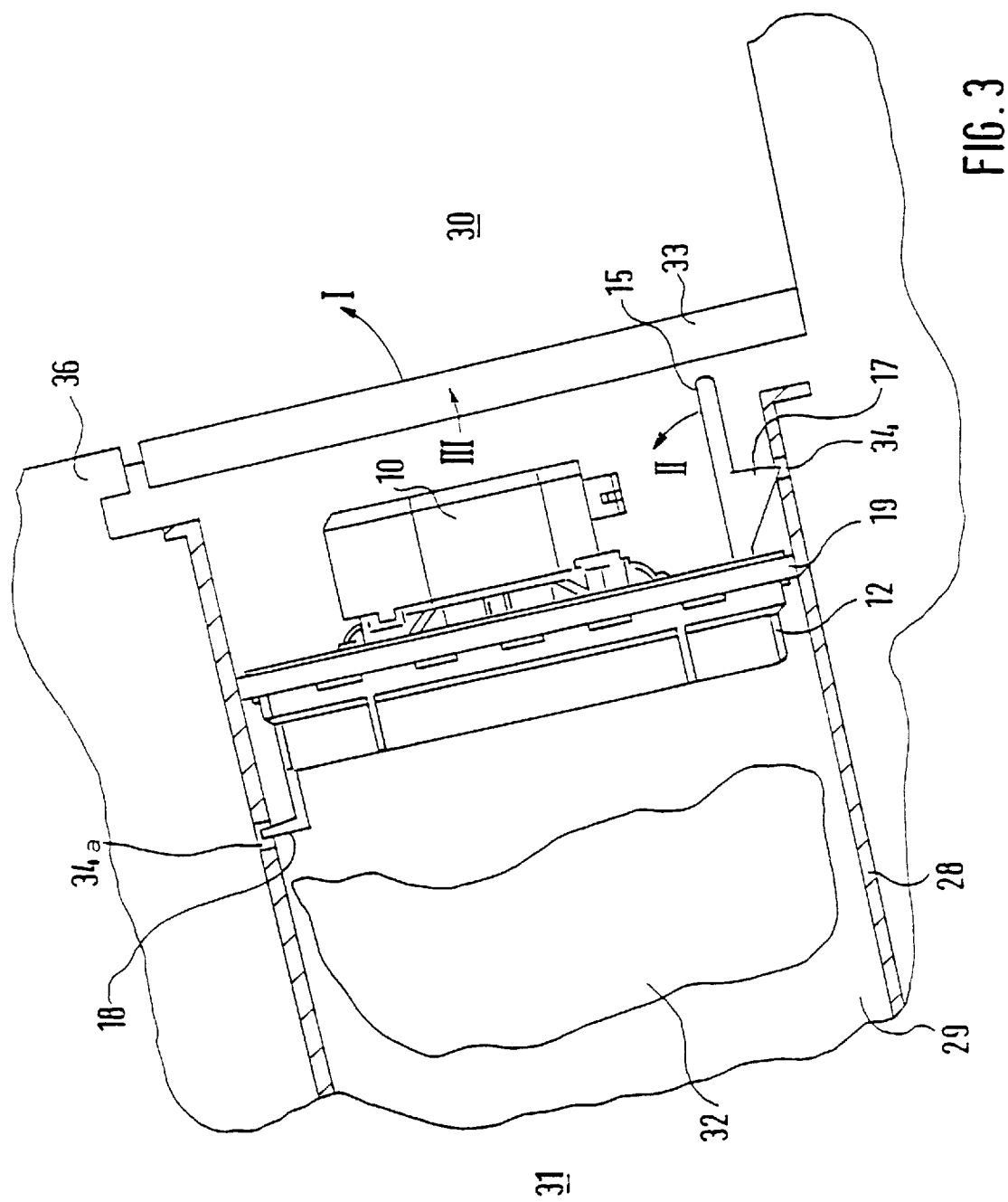
FIG. 3 shows a possible installation mode of a loudspeaker according to FIG. 1.

One of the side walls (14) of the mounting frame (12) is provided with a U-shaped handle (15) which is movable in the direction of the arrow as a result of the elastic properties of the material. Furthermore, each side (16) of the handle (15) is provided with fastening means in the form of a latch (17) which forms a first engaging means of two mutually complementary engaging means or parts together forming fastening means for fixing the chassis in the housing in a final position thereof. A second engaging part or means (34) is shown in FIG. 3 for being engaged by or mated with the first engaging means (17). In addition, as shown in FIG. 2, on the side opposite of the side (14) of the mounting frame (12), there are also provided latches (18) (not shown in FIG. 1) which similarly form first engaging means or parts which together with a second engaging part or means 34a (see FIG. 3) form another fastening means. In addition, the circumference of the mounting frame (12) is provided with a circumferential gasket (19). Contacting the woofer (10), while not shown in detail in FIG. 1, will be discussed in greater detail with reference to FIG. 2.

The illustration of FIG. 2 is a side view of an arrangement shown in FIG. 1. This illustration shows also the latches (18) disposed as first engaging means on the side opposite of the side (14) of the mounting frame (12). In addition, on the underside (20) of the mounting frame (12) there is formed a jack (21) disposed as first engaging means or part with a plurality of first contact means (22) disposed therein. Each of the contact means (22) of which only one is shown in FIG. 2, is connected to the respective connection on the connector block (24) of the loudspeaker (10) via respective lines (23).

Facing the jack (21), there is shown a connector (25) complementary thereto, disposed as a second engaging means or part and including second contact means (26) complementary to said first contact means (22). Each of these contact means (26) is connected to a current/voltage source (not shown) via lines (27). It should be pointed out for sake of completeness that the connector (25) and its holder already comprise a portion of a housing (28) which will be described in greater detail in FIGS. 3–5.

When the unit shown in FIG. 2 is moved towards the connector (26) substantially along an axis parallel to the center axis of the loudspeaker, then the second contact means (26) are aligned to contact the corresponding first contact means (22) in the jack (21). Conversely, for preventing short circuits on the live second contact means (26) when the contact between connector (25) and jack (21) is to be opened, there may be disposed on the connector (25), for example, sensors of a type known in the art for switching the second contact means (26) in conjunction with a known interrupt circuit at zero current if the connector (25)—as shown in FIG. 2—is not inserted into the jack (21). In the simplest case, a sensor of this type may be a metal blade inserted into the jack (21) which closes a circuit inside the connector (25) when jack (21) and connector (25) are connected, thereby signaling the interrupt circuit that the connection between the two contact means (22, 26) is established, whereafter power is supplied to the lines (27).

It should be mentioned for the sake of completeness that in another embodiment—which is not shown here—the first contact means (22) may also be formed by the latches (17) and/or (18). In this case, the corresponding openings (34, 34a) in the housing (28) (not shown in FIG. 2) can be used to form the second contact means (26).

FIG. 3 shows a unit of the type described in FIG. 1 which is placed in a housing (28) in a final position. The housing (28) is preferably a push-through tunnel (29) located in the rear seat back (36) of the automobile and connecting the interior (30) of the vehicle with the trunk (31). In this case, the walls of the tunnel form the housing. This push-through tunnel can be used, as recommended by the car manufacturer, as an opening for ski bags. In the embodiment depicted in FIG. 3, the ski bag (32) is rolled up inside the tunnel (29). When the arrangement depicted in FIG. 3 is to be used according to its intended purpose as an opening for ski bags, then first the cover (33) has to be removed or moved as indicated by the arrow I. The loudspeaker (10) will become visible as a result.

The latches (17) are subsequently moved out of their complementary openings (34) in the housing (28) by simply lifting the handle (15) as indicated by the arrow II, the loudspeaker can then be removed from the tunnel (29) by a rotating motion as indicated by the arrow III which is required to disengage the upper latches (18). When the loudspeaker (10) is to be reinserted into the tunnel, then the order of the aforedescribed operations will have to be reversed. It is evident that upon insertion of the loudspeaker (10), the latches (17) glide along the wall of the housing (28) until they lock in a final position in the openings (34) as a result of the return motion of the handle (15).

It can also be seen from FIG. 3 that the gasket (19) shown in FIGS. 1 and 2 provides a seal between the chassis (13) and the housing when the chassis (13) assumes its final position in the housing (28).

For the sake of clarity, contacting of the loudspeaker (10) is not illustrated in FIG. 3. The same situation depicted in FIG. 3 is also shown in FIG. 4. In contrast to the illustration of FIG. 3, however, the chassis (13) of the loudspeaker (10) is in this case permanently secured to the housing (28) by way of a hinge assembly (35). When the tunnel (29) is to be utilized for its original purpose as a ski bag (32), then the loudspeaker (10) can be disengaged, moved forward and rotated about the axis of the hinge (35). The latter situation is described in greater detail in FIG. 5. As also shown in FIG. 5, the ski bag (32) is unrolled in the direction of the interior space (30) of the vehicle when the tunnel (29) is used to push other items through. Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Loudspeaker including a chassis (13) and a housing (28), wherein the chassis (13) is inserted into the housing (28) and a final position of the chassis (13) in the housing (28) resulting from said insertion is fixed by way of at least one fastening means (17/34, 18/34) formed from two mutually complementary parts (17/34, 18/34) comprising a first part (17, 18, 21) and a second part (34, 34a, 25), wherein said chassis is fixed by at least a certain number of said at least one fastening means including one or more movably operable handles (15) having said first part (17) thereon for engaging said second part (34) for fixing said chassis in said final position; and wherein the chassis (13) fixed in the housing (28) is movable from the final position by operating said handles to disengage said first part and said second part.

2. Loudspeaker according to claim 1 wherein fastening means (18/34) without a handle (15) is formed by said first part comprising a latch (18) and said second part an opening (34a) for engaging the latch (18) for locking the chassis (13) in said final position in the housing (28).

3. Loudspeaker according to claim 1, wherein at least one fastening means is formed as a hinge assembly (35), whereby for releasing the chassis from the final position the chassis (13) is rotatably secured in the housing (28) for rotation about the hinge assembly (35).

4. Loudspeaker according to claim 1, wherein on the chassis (13) there are provided first electrical contact means (22) and on the housing (28) there are provided second electrical contact means (26) complementary to the first contact means (22), wherein at least one conductive link is established between said first contact means and said second contact means (22, 26) in said final position of said chassis in the housing (28).

5. Loudspeaker according to claim 4, wherein at least one fastening means is formed by the two mutually complementary parts with the first electrical contact means and the second electrical contact means formed therewith.

6. Loudspeaker according to claim 1, wherein the housing (28) is formed by a push-through tunnel (29) connecting a trunk (31) of an automobile with an interior space (30) thereof.

7. Loudspeaker according to claim 6, wherein the push-through tunnel (29) is an opening for a ski bag.

8. Loudspeaker according to claim 1, wherein the chassis (13) is provided with a gasket (19) for preventing a penetration of gas between walls of the housing (28) and the chassis (13) when the chassis (13) is in said final position in the housing (28).

9. Loudspeaker according to claim 4, wherein there is provided a sensor connected to an interrupt circuit for interrupting said conductive link when the chassis (13) is disengaged from said final position in the housing (28).

10. Loudspeaker including a chassis (13) and a housing (28), wherein the chassis (13) is inserted into the housing (28) and a final position of the chassis (13) in the housing (28) resulting from said insertion is fixed by way of at least one fastening means (17/34, 18/34) formed from two mutually complementary parts (17/34, 18/34) comprising a first part (17, 18, 21) and a second part (34, 34a, 25), wherein said chassis is fixed by at least a certain number of said at least one fastening means including one or more movably operable handles (15) having said first part (17) thereon for engaging said second part (34) for fixing said chassis in said final position, and wherein the chassis (13) fixed in the housing (28) is movable from the final position by operating said handles to disengage said first part and said second part, and wherein fastening means (18/34) without a handle (15) is formed by said first part comprising a latch (18) and said second part comprising an opening (34a) for engaging the latch (18) for locking the chassis (13) in said final position in the housing (28).

11. A loudspeaker for arranging in a housing (28) having indentations (34), wherein the loudspeaker comprises a pivotally-mounted handle (15) having a latch (17) for engaging one of the indentations (34) of the housing (28) when the handle (15) is pivoted and the loudspeaker is arranged in the housing (28), and for disengaging the indentation (34) of the housing (28) when the handle is pivoted to remove the loudspeaker from the housing (28) and wherein the loudspeaker further comprises an upper latch (18) for engaging another one of the indentations (34a) of the housing when the loudspeaker is arranged in the housing, and wherein the upper latch (18) engages the indentation (34a) so that when both latches (17, 18) are engaged, the loudspeaker is locked in a fixed position when arranged in the housing.

* * * * *